United States Patent
Tsuchida et al.

(10) Patent No.: US 12,415,492 B2
(45) Date of Patent: Sep. 16, 2025

(54) PARKING BRAKE CONTROL DEVICE

(71) Applicant: Astemo Ueda, Ltd., Ueda (JP)

(72) Inventors: Takeru Tsuchida, Ueda (JP); Mari Takahashi, Ueda (JP)

(73) Assignee: Astemo Ueda, Ltd., Nagano (JP)

( * ) Notice: Subject to any disclaimer, the term of this patent is extended or adjusted under 35 U.S.C. 154(b) by 0 days.

(21) Appl. No.: 18/003,198

(22) PCT Filed: Jun. 21, 2021

(86) PCT No.: PCT/JP2021/023295
§ 371 (c)(1),
(2) Date: Dec. 23, 2022

(87) PCT Pub. No.: WO2021/261413
PCT Pub. Date: Dec. 30, 2021

(65) Prior Publication Data
US 2023/0256950 A1     Aug. 17, 2023

(30) Foreign Application Priority Data

Jun. 24, 2020 (JP) .................. 2020-108365

(51) Int. Cl.
*B60T 13/58* (2006.01)
*B60T 13/74* (2006.01)
*B60T 17/22* (2006.01)

(52) U.S. Cl.
CPC .......... *B60T 13/588* (2013.01); *B60T 13/746* (2013.01); *B60T 17/22* (2013.01); *B60T 2240/03* (2013.01);
(Continued)

(58) Field of Classification Search
CPC ...... B60T 13/588; B60T 13/746; B60T 17/22; B60T 2240/03; B60T 2270/402;
(Continued)

(56) References Cited

U.S. PATENT DOCUMENTS

| 6,019,436 A | 2/2000 | Siepker |
| 8,746,809 B2 | 6/2014 | Tachiiri |

(Continued)

FOREIGN PATENT DOCUMENTS

| JP | H1076931 A | 3/1998 |
| JP | 2008143271 A | 6/2008 |

(Continued)

OTHER PUBLICATIONS

International Search Report issued for International Patent Application No. PCT/JP2021/023295, Date of mailing: Jul. 27, 2021, 6 pages including English translation.

(Continued)

*Primary Examiner* — Rodney A Butler
(74) *Attorney, Agent, or Firm* — HSML P.C.

(57) ABSTRACT

A parking brake control device controls a hydraulic pressure unit for braking wheels hydraulically and a parking brake device for braking the wheels by transmitting power of an electric motor to the wheels mechanically. The parking brake control device includes a hydraulic brake control unit capable of exercising a hydraulic brake control under which a brake is applied to the wheels by the hydraulic pressure unit, on condition that a signal is received from an actuation switch for actuating the parking brake device, while a vehicle is running, and a pressure decrease rate setting unit configured to set a pressure decrease rate according to a closing condition satisfied upon entry into the closing stage of the hydraulic brake control when a pressure decrease control is exercised in a closing stage of the hydraulic brake control.

6 Claims, 7 Drawing Sheets

(52) U.S. Cl.
CPC ..... *B60T 2270/402* (2013.01); *B60T 2270/88* (2013.01); *B60Y 2400/3032* (2013.01); *B60Y 2400/81* (2013.01)

(58) Field of Classification Search
CPC ...... B60T 2270/88; B60T 7/042; B60T 7/085; B60T 8/4081; B60T 13/146; B60T 13/662; B60T 13/686; B60T 13/741; B60T 7/12; B60T 17/18; B60Y 2400/3032; B60Y 2400/81
See application file for complete search history.

(56) References Cited

U.S. PATENT DOCUMENTS

| | | | |
|---|---|---|---|
| 9,855,941 | B2 | 1/2018 | Kato |
| 10,801,620 | B2 | 10/2020 | Shirakawa |
| 2005/0029865 | A1* | 2/2005 | Kobayashi .............. B60T 7/122 303/191 |
| 2011/0240418 | A1* | 10/2011 | Tachiiri ................. B60T 13/588 188/72.4 |
| 2016/0297415 | A1 | 10/2016 | Kato |
| 2019/0331221 | A1 | 10/2019 | Shirakawa |

FOREIGN PATENT DOCUMENTS

| | | |
|---|---|---|
| JP | 2011213205 A | 10/2011 |
| JP | 2015101976 A | 6/2015 |
| JP | 2018135040 A | 8/2018 |
| JP | 2019189109 A | 10/2019 |

OTHER PUBLICATIONS

Written Opinion issued for International Patent Application No. PCT/JP2021/023295, Date of mailing: Jul. 27, 2021, 10 pages including English translation.

Notice of Reasons for Refusal issued for Japanese Patent Application No. 2022-531955, Dispatch date: Feb. 18, 2025, 12 pages including English machine translation.

* cited by examiner

PARKING BRAKE CONTROL DEVICE

TECHNICAL FIELD

This disclosure relates to a parking brake control device.

BACKGROUND ART

A parking brake control device that controls a hydraulic pressure unit for braking wheels hydraulically, and a parking brake device for braking the wheels by transmitting power of an electric motor to the wheels mechanically is known in the art (see JP H10-76931 A).

SUMMARY OF INVENTION

The parking brake control device capable of exercising the hydraulic and mechanical brake control as known in the conventional art can be configured such that while a vehicle is running, the hydraulic brake control can be triggered by a driver actuating a parking switch. However, thus-activated hydraulic brake control will be brought to an end in time, and the end will come under various situations; thus, decrease of pressure at a uniform rate in the closing stage of the hydraulic brake control would potentially entail various disadvantages. For example, if one who has actuated the parking switch in the moving vehicle now wants to accelerate the vehicle again by actuating the accelerator, the hydraulic brake control should be brought to an end; in this situation, however, if the rate of decrease of the pressure in the closing stage has been set low, the braking power decreases very slowly; therefore, the driver feels frustrated as if "dragging", by failing to feel anticipated acceleration or good pickup in the vehicle velocity. On the other hand, when actuation of the parking switch effected while the vehicle is running makes the vehicle stop running, one may presume that the hydraulic brake control should be brought to an end and the brake control should be switched to the mechanical brake control; however, if the rate of decrease of the pressure in the closing stage has been set high, the fluid pressure would disadvantageously become zero before application of the braking power of the mechanical brake control becomes sufficiently effective. In that event, the vehicle once stopped would move again slightly, and make a passenger feel uncomfortable.

It would be desirable to minimize the passenger's discomfort even when the brake is applied by actuation of the parking switch.

Against the backdrop, a parking brake control device is disclosed which controls a hydraulic pressure unit for braking wheels hydraulically and a parking brake device for braking the wheels by transmitting power of an electric motor to the wheels mechanically. In one aspect, the parking brake control device comprises: a hydraulic brake control unit capable of exercising a hydraulic brake control under which a brake is applied to the wheels by the hydraulic pressure unit, on condition that a signal is received from an actuation switch for actuating the parking brake device, while a vehicle is running; and a pressure decrease rate setting unit configured to set a rate of decrease of pressure in such a manner that when a pressure decrease control is exercised in a closing stage of the hydraulic brake control, the rate of decrease of pressure is set according to a closing condition satisfied upon entry into the closing stage of the hydraulic brake control.

With this configuration, in which the rate of decrease of pressure is set according to the closing condition of the hydraulic brake control, a passenger's discomfort can be restrained even when the brake is applied by the use of the actuation switch for actuating the parking brake device The pressure decrease rate setting unit may be configured to set the rate of decrease of pressure at a first pressure decrease rate having a value greater than a minimum value thereof, if the closing condition is receipt of a request for cancellation of the hydraulic brake control as submitted by a driver's operation while the vehicle is running.

With this configuration, in which the pressure decrease control is exercised at the rate of decrease of pressure as set at the first pressure decrease rate having a value greater than the minimum value if the pressure decrease control is exercised on the basis of the request for cancellation of the hydraulic brake control, a driver can be relieved from feeling frustrated as if "dragging", in comparison, for example, with an alternative configuration in which the pressure decrease control is exercised at the minimum rate of decrease of pressure.

The parking brake control device may comprise a switching unit configured to switch a brake control from the hydraulic brake control to a mechanical brake control under which a brake is applied to the wheels by the electric motor of the parking brake device, and the switching unit may be configured to switch the brake control from the hydraulic brake control to the mechanical brake control when the vehicle has been stopped, wherein if the closing condition is a stop of the vehicle, the pressure decrease rate setting unit sets the rate of decrease of pressure at a second pressure decrease rate lower than the first pressure decrease rate.

With this configuration, in which the pressure decrease control is exercised at the rate of decrease of pressure as set at the second pressure decrease rate lower than the first pressure decrease rate if the pressure decrease control is exercised on the basis of the stop of the vehicle, the braking power to be applied when the brake control is switched from the hydraulic brake control to the mechanical brake control can be maintained so that the vehicle can be kept in a stopped state properly, in comparison, for example with an alternative configuration in which the pressure decrease control is exercised at the first pressure decrease rate when the vehicle has been stopped.

The switching unit may be configured to switch the brake control from the hydraulic brake control to the mechanical brake control when an abnormal condition has been detected in the hydraulic pressure unit, wherein if the closing condition is an abnormal condition in the hydraulic pressure unit, the pressure decrease rate setting unit sets the rate of decrease of pressure at a third pressure decrease rate lower than the first pressure decrease rate and higher than the second pressure decrease rate.

With this configuration, in which the pressure decrease control is exercised at the rate of decrease of pressure as set at the third pressure decrease rate lower than the first pressure decrease rate and higher than the second pressure decrease rate if the pressure decrease control is exercised on the basis of the abnormal condition in the hydraulic pressure unit, the brake control can be switched from the hydraulic brake control to the mechanical brake control properly when the abnormal condition has been detected in the hydraulic pressure unit.

The pressure decrease rate setting unit may be configured to set the first pressure decrease rate at a first rate if a vehicle body velocity is a first velocity, and set the first pressure decrease rate at a second rate higher than the first rate if the vehicle body velocity is a second velocity higher than the first velocity.

With this configuration, the higher the vehicle body velocity, the less likely the driver can be to feel frustrated as if "dragging", so that the driver's discomfort can be restrained more effectively.

In a configuration of the parking brake control device comprising a switching unit configured to switch a brake control from the hydraulic brake control to a mechanical brake control under which a brake is applied to the wheels by the electric motor of the parking brake device, when an abnormal condition has been detected in the hydraulic pressure unit, the pressure decrease rate setting unit may be configured to set the rate of decrease of pressure at a third pressure decrease rate lower than the first pressure decrease rate, if the closing condition is an abnormal condition in the hydraulic pressure unit.

With this configuration, in which the pressure decrease control is exercised at the rate of decrease of pressure as set at the third pressure decrease rate lower than the first pressure decrease rate, if the pressure decrease control is exercised on the basis of the abnormal condition in the hydraulic pressure unit, the brake control can be switched from the hydraulic brake control to the mechanical brake control properly when the abnormal condition has been detected in the hydraulic pressure unit.

In a configuration of the parking brake control device comprising a switching unit configured to switch the brake control from the hydraulic brake control to a mechanical brake control under which a brake is applied to the wheels by the electric motor of the parking brake device, when the vehicle has been stopped or when an abnormal condition has been detected in the hydraulic pressure unit, the pressure decrease rate setting unit may be configured to set the pressure decrease rate at a second pressure decrease rate if the closing condition is a stop of the vehicle, and set the pressure decrease rate at a third pressure decrease rate higher than the second pressure decrease rate if the closing condition is an abnormal condition in the hydraulic pressure unit.

With this configuration, the pressure decrease control is exercised at the rate of decrease of pressure as set at the second pressure decrease rate lower than the third pressure decrease rate if the pressure decrease control is exercised on the basis of the stop of the vehicle; therefore, the braking power to be applied when the brake control is switched from the hydraulic brake control to the mechanical brake control can be maintained so that the vehicle can be kept in a stopped state properly, in comparison, for example, with an alternative configuration in which the pressure decrease control is exercised at the third pressure decrease rate when the vehicle has been stopped. In addition, since the pressure decrease control is exercised at the rate of decrease of pressure as set at the third pressure decrease rate higher than the second pressure decrease rate if the pressure decrease control is exercised on the basis of the abnormal condition in the hydraulic pressure unit, the brake control can be switched from the hydraulic brake control to the mechanical brake control properly when the abnormal condition has been detected in the hydraulic pressure unit.

DESCRIPTION OF EMBODIMENTS

A detailed description will be given of one embodiment of a parking brake control device with reference made to the drawings where appropriate.

Figure 1:
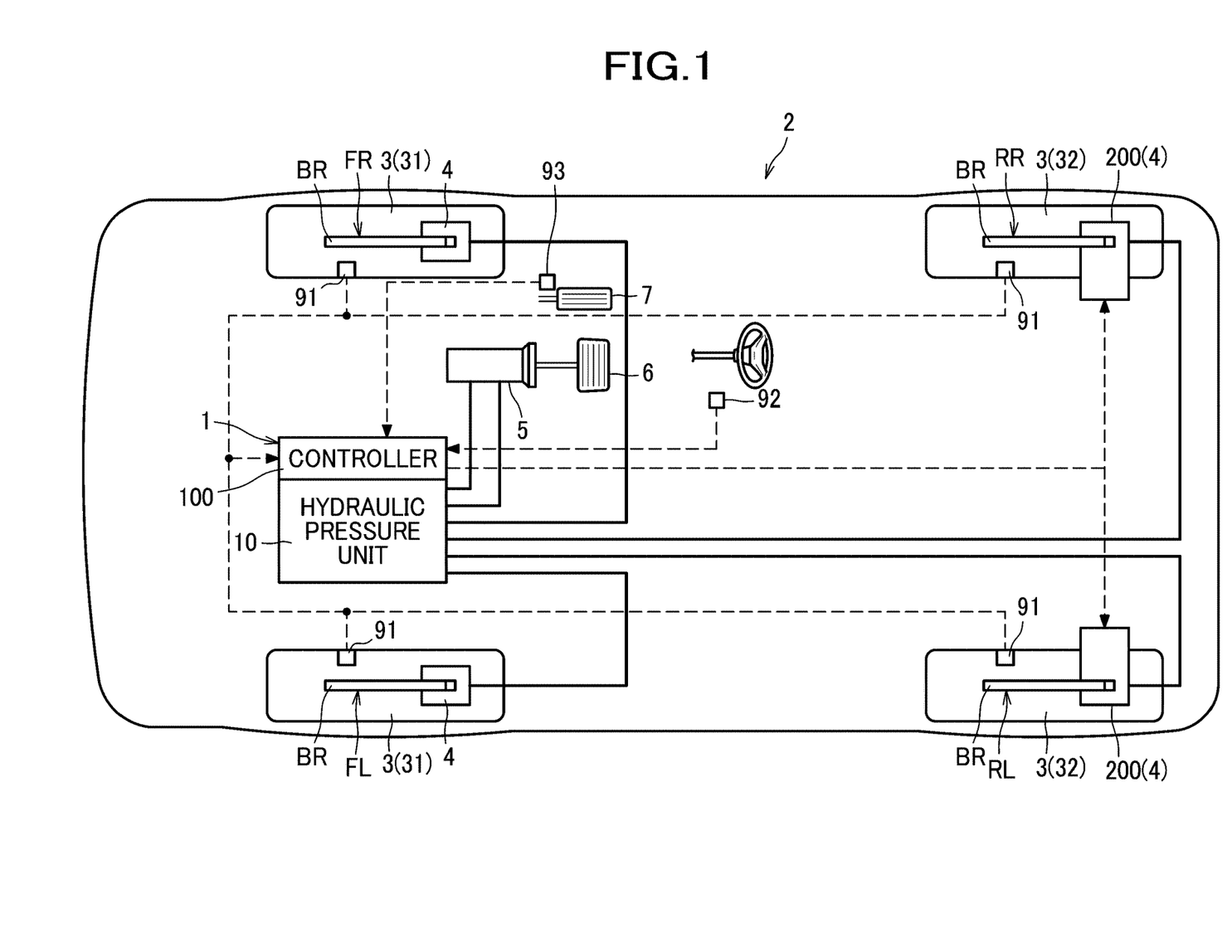
FIG. 1 is a schematic diagram of a vehicle equipped with a parking brake control device according to one embodiment.

As shown in FIG. 1, a vehicle 2 comprises wheel brakes FR, FL, RR, RL provided at right front, left front, right rear, and left rear wheels 3, and a vehicle brake fluid pressure control device 1 that brakes the wheels 3 by transmitting fluid pressure to the wheel brakes FR, FL, RR, RL.

Each of the front wheel brakes FR, FL comprises a brake rotor BR and a wheel cylinder 4. Each of the rear wheel brakes RR, RL comprises a brake rotor BR, a wheel cylinder 4, and a parking brake device 200. The wheel cylinder 4 and the parking brake device 200 applies braking power to the wheel 3 by pressing a friction pad 260 (see FIG. 3) against a brake rotor BR that is a rotating member that integrally rotates together with the wheel 3.

The vehicle brake fluid pressure control device 1 mainly includes a hydraulic pressure unit 10 for braking wheels 3 hydraulically, and a controller 100. The hydraulic pressure unit 10 is provided with fluid paths and various parts. The controller 100 exercises control over the various parts in the hydraulic pressure unit 10 in a suitable way.

A master cylinder 5 as a fluid pressure source and the wheel cylinders 4 are connected to the hydraulic pressure unit 10. The brake fluid pressure produced by the master cylinder 5 according to the depressing force of a brake pedal 6 (driver's braking operation) is regulated under control of the controller 100 and the hydraulic pressure unit 10, and provided to the wheel cylinders 4.

Wheel velocity sensors 91, a parking switch 92, and an accelerator sensor 93 are connected to the controller 100. Each of the wheel velocity sensors 91 detects a wheel velocity of a corresponding wheel 3. The parking switch 92 is an example of an actuation switch. The parking switch 92 is a switch for actuating the parking brake device 200, and is provided near a driver's seat. The parking switch 92 may be configured to turn ON when a parking lever (not shown) operated by the driver is pulled by the driver, and turn OFF when the driver takes his/her hand off the parking lever. The accelerator sensor 93 detects a motion of an accelerator pedal 7.

The controller 100 comprises a CPU (Central Processing Unit), a RAM (Random Access Memory), a ROM (Read Only Memory), and an input/output circuit, and is configured to exercise control by performing various operations based on inputs from the parking switch 92 and the sensors 91, 93, etc., and programs and data stored in the ROM. Details of the controller 100 will be explained later.

Figure 2:
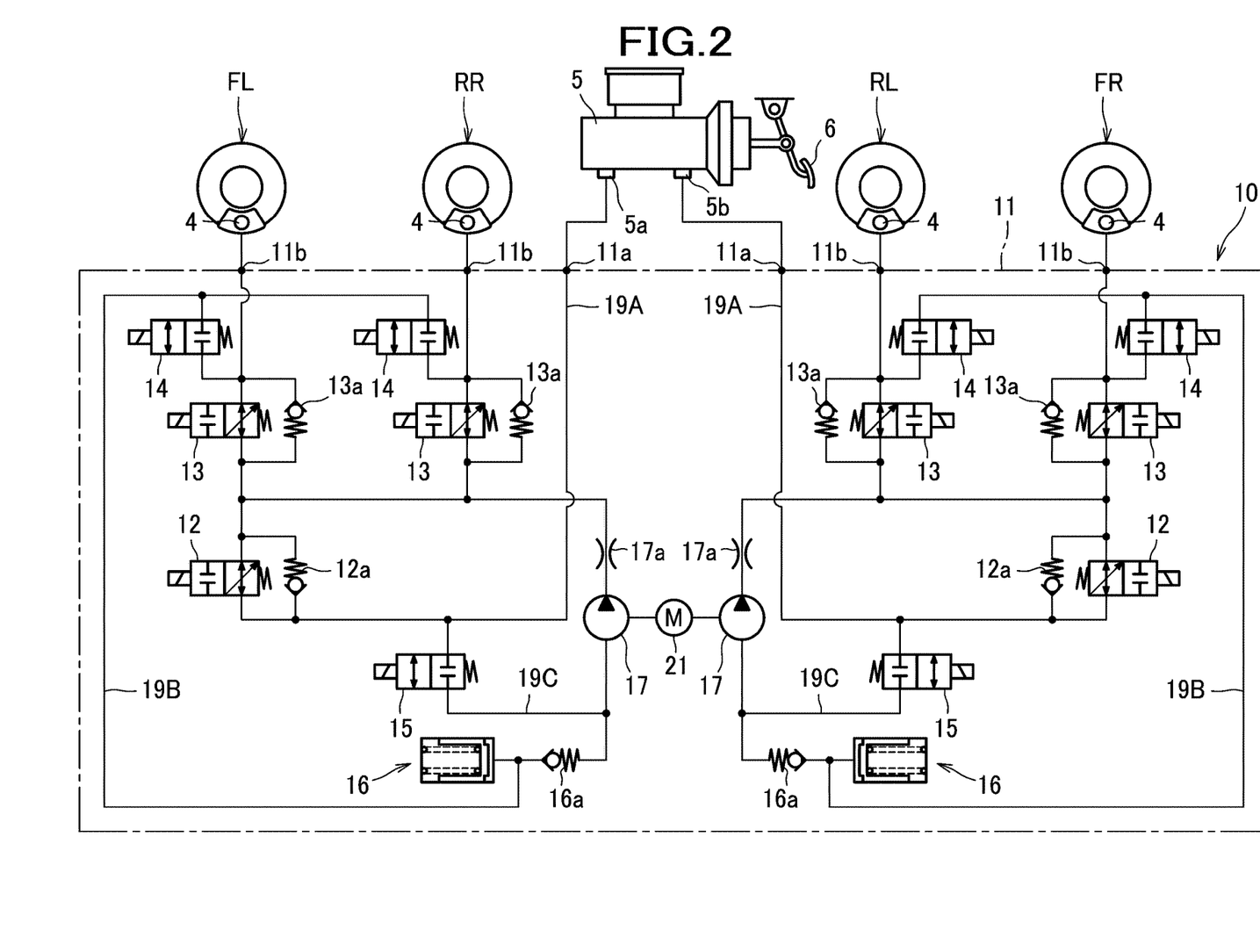
FIG. 2 is a schematic diagram showing a configuration of a hydraulic pressure unit.

As shown in FIG. 2, the hydraulic pressure unit 10 is located between the master cylinder 5 and the wheel brakes FR, FL, RR, RL.

The hydraulic pressure unit 10 is comprised of fluid paths and various solenoid valves arranged in a pump body 11 that is a base body having the fluid paths (hydraulic line) formed therein through which a brake fluid circulates. Output ports 5a, 5b of the master cylinder 5 are connected to input ports 11a of the pump body 11, and output ports 11b of the pump body 11 are connected to the wheel brakes FL, RR, RL, FR. During normal operations, fluid paths from the input ports 11a to the output ports 11b inside the pump body 11 are connected to each other and form a hydraulic line so that the depressing force of the brake pedal 6 is transmitted to the respective wheel brakes FL, RR, FL, FR. The hydraulic pressure system connected to the output port 5a of the master cylinder 5 is connected to the wheel brakes FL, RR, and the hydraulic pressure system connected to the output port 5b of the master cylinder 5 is connected to the wheel brakes RL, FR, and these hydraulic pressure systems have approximately the same configuration.

Each of the hydraulic pressure systems has a pressure-regulating valve 12 provided on the hydraulic line connecting the input port 11a and the output port 11b. The pressure-regulating valve 12 is a normally open proportional solenoid valve that can regulate a difference between fluid pressures upstream and downstream thereof according to an electric current supplied thereto. A check valve 12a that allows a flow only to the output port 11b is provided in parallel with the pressure-regulating valve 12.

Hydraulic lines between the pressure-regulating valve 12 and the wheel brakes FL, RR, RL, FR are each bifurcated off at some midpoint and connected to the corresponding output port 11b. An inlet valve 13 that is a normally open proportional solenoid valve is provided on each of the branch hydraulic lines corresponding to the output ports 11b. A check valve 13a that allows a flow only to the pressure-regulating valve 12 is provided in parallel with each inlet valve 13.

A return hydraulic line 19B that is branched off from a point between the output port 11b and the inlet valve 13 corresponding thereto, and connected to a point between the pressure-regulating valve 12 and the inlet valve 13 via an outlet valve 14 that is a normally closed solenoid valve is provided.

On the return hydraulic line 19B, a reservoir 16 for temporarily accommodating an excessive brake fluid, a check valve 16a, a pump 17, and an orifice 17a are arranged from a position closest to the outlet valve 14 in this order. The check valve 16a is arranged to allow a flow only to the point between the pressure-regulating valve 12 and the inlet valve 13. The pump 17 is driven by a motor 21, and provided to generate pressure toward the point between the pressure-regulating valve 12 and the inlet valve 13. The orifice 17a attenuates pulsation of pressure of a brake fluid discharged from the pump 17 and pulsation caused by operation of the pressure-regulating valve 12.

An influent hydraulic line 19A connecting the input port 11a and the pressure-regulating valve 12 is connected to a section between the check valve 16a and the pump 17 on the return hydraulic line 19B by a suction hydraulic line 19C. A suction valve 15 that is a normally closed solenoid valve is provided on the suction hydraulic line 19C.

The hydraulic pressure unit 10 configured as described above is operated in normal times in such a manner that each of the solenoid valves is not energized, and a brake fluid pressure introduced from the input ports 11a is outputted through the pressure-regulating valves 12 and the inlet valves 13 to the output ports 11b, and thus given as-is to the wheel brakes FL, RR, RL, FR. When an antilock braking control is exercised, or on any other occasions, to reduce an excessive brake fluid pressure in the wheel brakes FL, RR, RL, FR, the relevant inlet valve(s) 13 is closed and the relevant outlet valve(s) 14 is opened so that the brake fluid is let flow through the return hydraulic line 19B into the reservoir 16 so that the brake fluid in the wheel cylinder 4 can be drained out. To exert pressure on the wheel brakes FL, RR, RL, FR without driver's operation of the brake pedal 6, the suction valve 15 is opened, and the motor 21 is activated, so that the brake fluid can be proactively supplied to the wheel brakes FL, RR, RL, FR by the action of the pump 17. Furthermore, to adjust the levels of pressure exerted on the wheel brakes FL, RR, RL, FR, the electric current supplied to the pressure-regulating valve 12 can be regulated so that the levels of pressure can be adjusted as desired.

Figure 3:
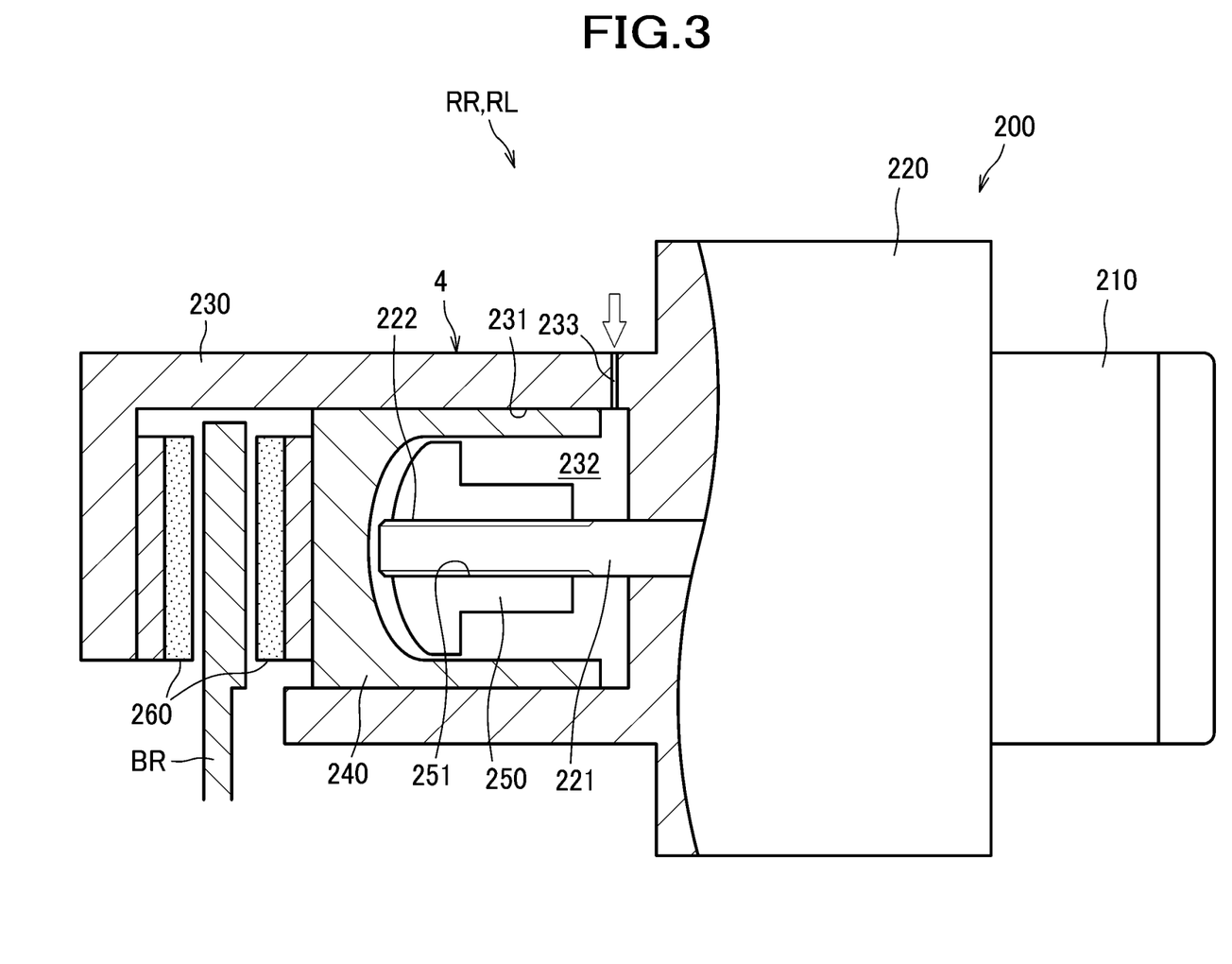
FIG. 3 is a diagram showing a structure of a rear-side wheel brake.

As shown in FIG. 3, the wheel brakes RR, RL each comprise a wheel cylinder 4, a parking brake device 200, a pair of friction pads 260, and a brake rotor BR. The friction pads 260 are located to hold the brake rotor BR.

The parking brake device 200 comprises an electric motor 210, a speed reducer 220, and a nut 250. The wheel cylinder 4 comprises a housing 230 and a brake piston 240.

The electric motor 210 is a reversible motor, and includes an output shaft (not shown) coupled to the speed reducer 220.

The speed reducer 220 is a mechanism for reducing the speed with which power of the electric motor 210 is transmitted, and comprises a plurality of gears inside. An external thread 222 is formed on the output shaft 221 of the speed reducer 220.

The housing 230 has a cylinder hole 231 in which the brake piston 240 is supported and allowed to move in the axial direction of the speed reducer 220. The cylinder hole 231 is formed to have a cylindrical shape with one base closed and the other base opening toward the friction pads 260.

The brake piston 240 is formed to have a hollow cylindrical shape, oriented with one base closed and the other base opening toward the closed base of the cylinder hole 231, and located inside the cylinder hole 231. One of the friction pads 260 is attached to the brake piston 240. A fluid pressure chamber 232 formed by the brake piston 240 and the cylinder hole 231 is configured to be filled with a brake fluid supplied from the hydraulic pressure unit 10 described above through a fluid path 233 formed in the housing 230 or the like. Accordingly, the brake piston 240 advances with the friction pad 260 at the forefront thereof toward the other one of the friction pads 260, by fluid pressure exerted by the hydraulic pressure unit 10, so that the friction pads 260 can be pressed against the brake rotor BR. In short, the wheel brakes RR, RL have a function of pressing the friction pads 260 against the brake rotor BR by the fluid pressure derived from the hydraulic pressure unit 10.

The nut 250 has an internal thread 251 which allows the external thread 222 of the output shaft 221 of the speed reducer 220 to be screwed therein. The nut 250 is located inside the brake piston 240, and engaged with the brake piston 240, thereby prevented from rotating relative to the brake piston 240, and allowed to move in the axial direction. Accordingly, when the electric motor 210 runs in the normal direction, the nut 250 advances toward the friction pads 260, and thus can cause the friction pads 260 to be pressed against the brake rotor BR. When the electric motor 210 runs in the reverse direction, the nut 250 moves backward away from the friction pads 260, so that the pressing force of the friction pads 260 exerted on the brake rotor BR is removed. In other words, the parking brake device 200 has a function of transmitting a power generated by the electric motor 210 rotating in the normal direction, mechanically to the friction pads 260 without the use of fluid pressure, to thereby cause the friction pads 260 to be pressed against the brake rotor BR.

Next, details of the controller 100 will be described below.

Figure 4:
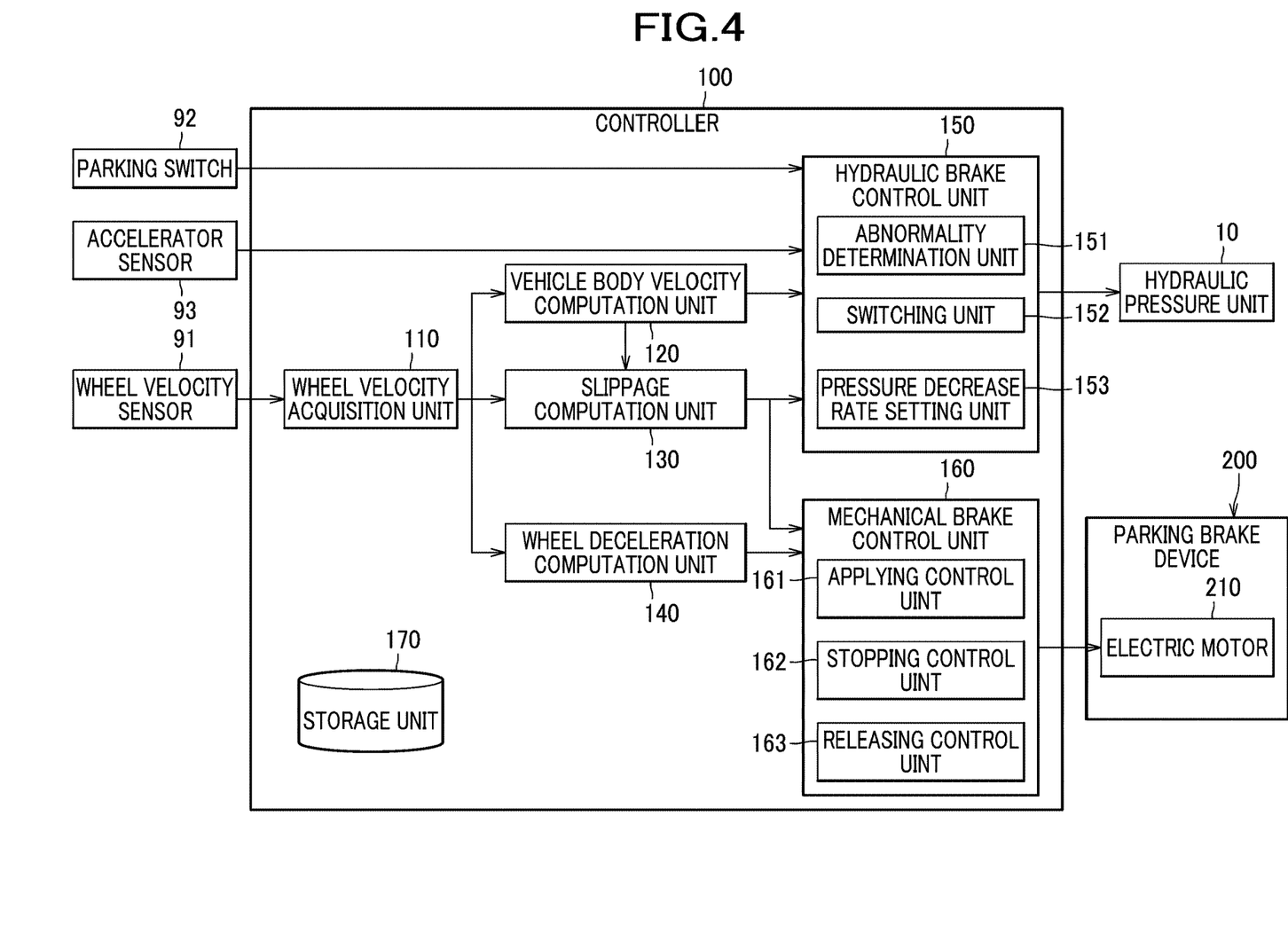
FIG. 4 is a block diagram showing a configuration of a controller.

As shown in FIG. 4, the controller 100 comprises a wheel velocity acquisition unit 110, a vehicle body velocity computation unit 120, a slippage computation unit 130, a wheel deceleration computation unit 140, a hydraulic brake control unit 150, a mechanical brake control unit 160, and a storage unit 170. The controller 100 functions as a parking brake control device for exercising control over the parking brake device 200.

The wheel velocity acquisition unit 110 has a function of acquiring a wheel velocity Vw of each wheel 3 from a corresponding wheel velocity sensor 91. The wheel velocity acquisition unit 110 which has acquired wheel velocities Vw of the wheels 3 outputs the acquired wheel velocities Vw to the vehicle body velocity computation unit 120, the slippage computation unit 130, and the wheel deceleration computation unit 140.

The vehicle body velocity computation unit 120 has a function of computing (estimating) a vehicle body velocity Vc by a known method of computation, based on the wheel velocity Vw outputted from the wheel velocity acquisition unit 110. The method of computation of the vehicle body velocity Vc may be selected from among various methods; to cite one example, a method may be such that, for example, a wheel velocity Vw of a front wheel is assumed as the vehicle body velocity Vc in principle, and if the acceleration or deceleration of the wheel velocity Vw of the front wheel exceeds a predetermined upper limit, the vehicle body velocity Vc is set at such a value as assumed if the acceleration or deceleration of the wheel velocity Vc is the upper limit. It is to be understood that if the vehicle is provided with an acceleration sensor for detecting an acceleration in a forward or backward direction, the vehicle body velocity Vc may be computed based on the acceleration in the forward or backward direction. The vehicle body velocity computation unit 120 which has computed the vehicle body velocity Vc outputs the computed vehicle body velocity Vc to the slippage computation unit 130 and the hydraulic brake control unit 150.

The slippage computation unit 130 has a function of computing a slippage SL of each wheel 3, based on the wheel velocity Vw outputted from the wheel velocity acquisition unit 110 and the vehicle body velocity Vc outputted from the vehicle body velocity computation unit 120. To be more specific, the slippage SL can be determined as a difference between the vehicle body velocity Vc and the wheel velocity Vw. The slippage computation unit 130 which has computed the slippage SL outputs the slippage SL to the hydraulic brake control unit 150 and the mechanical brake control unit 150.

In the present embodiment, a value determined by subtracting the wheel velocity Vw from the vehicle body velocity Vc is used as a slippage SL; however, a slip ratio expressed as (Vc-Vw)/Vc may be used as a slippage SL, instead.

The wheel deceleration computation unit 140 has a function of computing a wheel deceleration Dw of each wheel 3, based on the wheel velocity Vw of each wheel 3. Herein, the wheel deceleration Dw taking a positive value indicates that the wheel is decelerating, and the wheel deceleration Dw taking a negative value indicates that the wheel is accelerating. The wheel deceleration Dw can, for example, be computed by subtracting the present value from the last value of the wheel velocities Vw. The wheel deceleration computation unit 140 which has computed the wheel deceleration Dw of each wheel 3 outputs the computed wheel decelerations Dw to the mechanical brake control unit 160.

The hydraulic brake control unit 150 has a function of exercising a hydraulic brake control under which the brakes are applied on the wheels 3 by the hydraulic pressure unit 10, for each of the wheels 3, based on an ON signal outputted from the parking switch 92 while the vehicle is running. To be more specific, the hydraulic brake control unit 150 executes the process of the hydraulic brake control when all of the following conditions have been satisfied: the vehicle body velocity Vc is equal to or higher than a predetermined value; and the parking switch 92 has been turned ON.

The hydraulic brake control includes an emergency brake control under which a brake fluid pressure is increased by the pump 17, and an anti-lock control under which the wheels 3 are restrained from locking up. The hydraulic brake control unit 150 starts the emergency brake control upon receipt of an ON signal outputted from the parking switch 92 while the vehicle is running, and thereafter executes the process of the anti-lock control.

The hydraulic brake control unit 150, in the process of the emergency brake control, activates the motor 21 of the hydraulic pressure unit 10, based on the ON signal from the parking switch 92.

The hydraulic brake control unit 150, in the process of anti-lock control, makes a determination, for each of the wheels 3, based on the wheel acceleration Aw and the slippage SL estimated from the wheel speed Vw, as to which state the brake fluid pressure to be exerted on each wheel 3 is set at, a decreasing state, a increasing state, or a unchanging state. To be more specific, if the slippage SL is equal to or greater than a predetermined threshold SLth and the wheel acceleration Aw is equal to or lower than 0, the hydraulic brake control unit 150 determines that the wheel 3 is about to lock, and decides to bring the brake fluid pressure into the decreasing state. If the wheel acceleration Aw is higher than 0, the hydraulic brake control unit 150 decides to bring the brake fluid pressure into the unchanging state, while if the slippage SL has become smaller than the predetermined threshold SLth and the wheel acceleration Aw is equal to or lower than 0, the hydraulic brake control unit 150 decides to bring the brake fluid pressure into the increasing state.

When the hydraulic brake control unit 150 has decided to bring the brake fluid pressure into the decreasing state, the hydraulic brake control unit 150 proceeds to exercise a pressure decrease control under which electric currents supplied to the inlet valve 13 and the outlet valve 14 of the hydraulic pressure unit 10 are regulated to close the inlet valve 13 and open the outlet valve 14. On the other hand, when the hydraulic brake control unit 150 has decided to bring the brake fluid pressure into the unchanging state, the hydraulic brake control unit 150 proceeds to exercise a pressure maintaining control under which electric currents supplied to the inlet valve 13 and the outlet valve 14 are regulated to close the both of the inlet valve 13 and the outlet valve 14.

Furthermore, when the hydraulic brake control unit 150 has decided to bring the brake fluid pressure into the increasing state, the hydraulic brake control unit 150 proceeds to exercise a pressure increase control under which electric currents supplied to the inlet valve 13 and the outlet valve 14 are regulated to open the inlet valve 13 and close the outlet valve 14.

The hydraulic brake control unit 150 comprises an abnormality determination unit 151, a switching unit 152, and a pressure decrease rate setting unit 153. The abnormality determination unit 151 has a function of determining whether or not an abnormal condition has occurred in the hydraulic pressure unit 10. If the abnormality determination unit 151 determines that an abnormal condition has occurred in the hydraulic pressure unit 10, then the abnormality determination unit 151 outputs an abnormality signal indicative of the occurrence of an abnormal condition, to the switching unit 152. To be specific, for example, if it is determined that an abnormal condition has occurred in the hydraulic pressure unit 10, then the abnormality determination unit 151 sets an abnormality flag at 1, while if it is determined that no abnormal condition has occurred, then the abnormality determination unit 151 sets the abnormality flag at 0.

The switching unit 152 has a function of switching the brake control, upon receipt of an abnormality signal from the abnormality determination unit 151 while the vehicle is running, from the hydraulic brake control to a mechanical brake control under which a brake is applied to rear wheels 32 by the electric motor 210 of the parking brake device 200. To be more specific, upon receipt of the abnormality signal from the abnormality determination unit 151 during the hydraulic brake control, the switching unit 152 brings the hydraulic brake control to an end, and outputs a signal indicative of an ON/OFF state of the parking switch 92 to the mechanical brake control unit 160. If the switching unit 152 receives an abnormality signal from the abnormality determination unit 151 before the hydraulic brake control is started, the switching unit 152 outputs a signal indicative of an ON/OFF state of the parking switch 92 to the mechanical brake control unit 160, while leaving the hydraulic brake control unactuated.

10) The switching unit 152 also has a function of switching the brake control from the hydraulic brake control to the mechanical brake control when the vehicle 2 has been stopped, specifically, when the vehicle body velocity Vc has become a value approaching 0 (e.g., 0). To be more specific, when the vehicle body velocity Vc has become a value approaching 0, the switching unit 152 brings the hydraulic brake control to an end, and outputs a signal indicative of an ON/OFF state of the parking switch 92 to the mechanical brake control unit 160.

The hydraulic brake control unit 150 has a function of bringing the hydraulic brake control to an end, not only upon switching of the control done by the switching unit 152 but also upon receipt of a request for cancellation of the hydraulic brake control as submitted by a driver's operation while the vehicle is running. To be more specific, a stop to receive an ON signal from the parking switch 92 or receipt of a signal from the accelerator sensor 93, as the 20 request for cancellation, triggers the cancellation and causes the hydraulic brake control unit 150 to bring the hydraulic brake control to an end.

In other words, three conditions for bringing the hydraulic brake control to an end are set up, as a closing condition in the present embodiment, that is: receipt of a request for cancellation of the hydraulic brake control as submitted by a driver's operation while the vehicle is running; a stop of the vehicle 2; and occurrence of an abnormal condition in the hydraulic pressure unit 10. Thus, the hydraulic brake control unit 150 brings the hydraulic brake control to an end if at least one of these plurality of closing conditions is satisfied. Specifically, if at least one of the plurality of closing conditions is satisfied, the hydraulic brake control unit 150 proceeds to exercise a pressure decrease control and ends the hydraulic brake control. Note that the pressure decrease control exercised in the closing stage of a process of the hydraulic brake control will also be called "closing-stage pressure decrease control" in following description.

The pressure decrease rate setting unit 153 has a function of setting a rate of decrease of pressure (pressure decrease rate R) in such a manner that when the closing-stage pressure decrease control is exercised, the pressure decrease rate R is set according to a closing condition of hydraulic brake control, satisfied upon entry into the closing stage of the process of the hydraulic brake control (hereinafter referred to also as "closing-stage condition"). To be more specific, if the closing-stage condition is receipt of a request for cancellation of the hydraulic brake control as submitted by a driver's operation while the vehicle is running, the pressure decrease rate setting unit 153 sets the pressure decrease rate R at a first pressure decrease rate R1 having a value greater than a minimum value thereof.

If the closing-stage condition is a stop of the vehicle 2, the pressure decrease rate setting unit 153 sets the pressure decrease rate R at a second pressure decrease rate R2 lower than the first pressure decrease rate R1. If the closing-stage condition is an abnormal condition in the hydraulic pressure unit 10, the pressure decrease rate setting unit 153 sets the pressure decrease rate R at a third pressure decrease rate R3 lower than the first pressure decrease rate R1 and higher than the second pressure decrease rate R2.

Moreover, the pressure decrease rate setting unit 153 is configured to set the first pressure decrease rate R1 according to the vehicle body velocity Vc. To be more specific, the pressure decrease rate setting unit 153 sets the first pressure decrease rate R1, based on the vehicle body velocity Vc and a first pressure decrease rate setting map as prepared for associating the first pressure decrease rate R1 with the vehicle body velocity Vc.

In the first pressure decrease rate setting map, the first pressure decrease rate R1 is set in such a manner that the higher the vehicle body velocity Vc, the lower the first pressure decrease rate R1 is. That is, the pressure decrease rate setting unit 153 sets the first pressure decrease rate R1 at a first rate R11 if the vehicle body velocity Vc is a first velocity V1, and sets the first pressure decrease rate R1 at a second rate R12 higher than the first rate R11 if the vehicle body velocity Vc is a second velocity V2 higher than the first velocity V1.

In the first pressure decrease rate setting map, the first pressure decrease rate R1 may be set, for example, in a range closer to a maximum value of the pressure decrease rate R. Specifically, the first pressure decrease rate R1 may be set at a value equal to or lower than the maximum value of the pressure decrease rate R and higher than the third pressure decrease rate R3.

The second pressure decrease rate R2 may be set, for example, at a minimum value of the pressure decrease rate R1. The second pressure decrease rate R2 may be set at a value equal to or higher than the minimum value of the pressure decrease rate R and lower than the third pressure decrease rate R3. It is understood that the maximum and the minimum values of the pressure decrease rate R mentioned above are determined, for example, by the capacities of the electric motor 210 an the speed reducer 220, etc.

The mechanical brake control unit 160 has a function of exercising a mechanical brake control upon receipt of a signal from the switching unit 152. The mechanical brake control includes a dynamic actuation control exercised while the vehicle 2 is running, and a static actuation control exercised while the vehicle 2 is stopped. The mechanical brake control unit 160 exercises the dynamic actuation control while the vehicle 2 is running, and exercises the static actuation control while the vehicle 2 is stopped.

The mechanical brake control unit 160 comprises an applying control unit 161 capable of exercising an applying control under which braking power applied to the wheels 3 is increased, a stopping control unit 162 capable of exercising a stopping control under which the braking power applied to the wheels 3 is maintained, and a releasing control unit 163 capable of exercising a releasing control under which the braking power applied to the wheels 3 is decreased.

Herein, the applying control is a control implemented by causing the electric motor 210 to run in the normal direction, thereby causing the nut 250 to advance toward the brake rotor BR at a constant speed. To be more specific, in the applying control, a steady electric current is applied to the electric motor 210 to increase a clamping force of the pair of friction pads 260.

The stopping control is a control implemented by causing the electric motor 210 to stop rotation to stop the nut 250. The releasing control is a control implemented by causing the electric motor 210 to run in the reverse direction, thereby causing the nut 250 to move back away from the brake rotor BR at a constant speed.

The mechanical brake control unit 160 exercises the applying control only, for the static actuation control. The mechanical brake control unit 160 exercises the applying control, the stopping control or the releasing control, selectively on an as appropriate basis for the dynamic actuation control.

The applying control unit 161 has a function of exercising an applying control which is started if a predetermined starting condition (i.e., the condition for starting the mechanical brake control) is satisfied.

To be more specific, the applying control unit 161 exercises the applying control in the static actuation control (i.e., control implemented by causing the electric motor 210 to run in the normal direction for a predetermined period of time), if a starting condition, for example, of the vehicle body velocity Vc assuming a value approaching 0 (e.g., 0) and the parking switch 92 being in the ON state is satisfied.

The applying control unit 161 exercises the applying control in the dynamic actuation control, if a starting condition, for example, of the vehicle body velocity Vc assuming a value equal to or higher than a predetermined value and the parking switch 92 being in the ON state is satisfied. In short, the applying control unit 161 exercises an applying control if a starting condition for actuating the parking brake device 200 is satisfied while a vehicle is running.

When the stopping control or the releasing control which will be described below are started, the applying control unit 161 brings the applying control to an end. To be more specific, the applying control unit 161 exercises the applying control if the wheel deceleration Dw is lower than a predetermined threshold Dth, for a period of time when the releasing control as will be described below is not exercised.

The stopping control unit 162 has a function of exercising a stopping control based on a wheel deceleration Dw outputted from the wheel deceleration computation unit 140. To be more specific, the stopping control unit 162 exercises the stopping control by stopping supply of an electric current to the electric motor 210, at least if the wheel deceleration Dw during the applying control is equal to or higher than the predetermined threshold Dth. To be more specific, the stopping control unit 162 exercises the stopping control if the wheel deceleration Dw is equal to or higher than the predetermined threshold Dth for a period of time when the releasing control as will be described below is not exercised. It is to be understood that the threshold Dth is a fixed value in this embodiment.

The releasing control unit 163 has a function of exercising a releasing control based on a slippage SL outputted from the slippage computation unit 130. To be more specific, the releasing control unit 163 exercises the releasing control if the slippage SL has become equal to or greater than the threshold SLth.

In short, the dynamic actuation control exercised by the mechanical brake control unit 160 is configured such that: if SL<SLth and Dw<Dth, then the applying control is exercised; if SL<SLth and Dw≥Dth, then the stopping control is exercised; and if SL≥SLth, then the releasing control is exercised.

The storage unit 170 stores the first pressure decrease rate setting map, the thresholds SLth, Dth, etc. as described above. The first pressure decrease rate setting map, and the thresholds SLth, Dth are set by experiment, simulation, etc. as appropriate.

Next, a detailed description will be given of an operation or process of closing-stage pressure decrease control of the controller 100.

Figure 5:
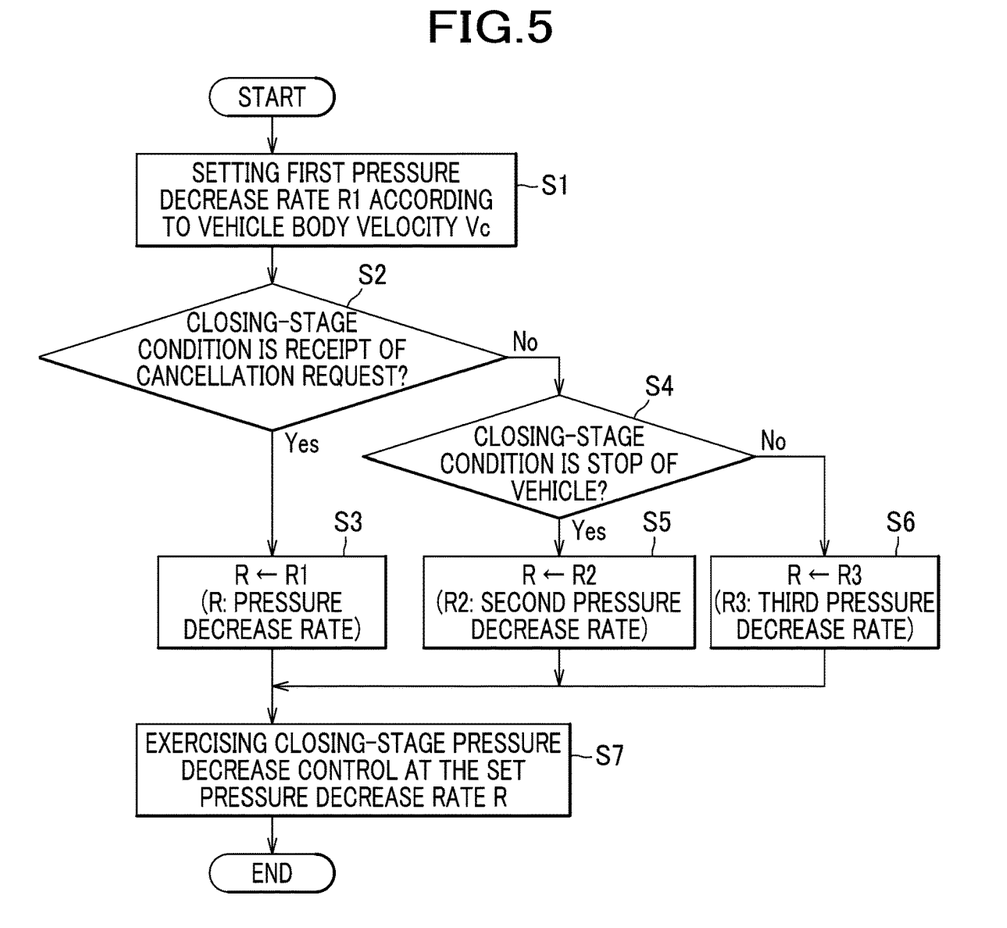
FIG. 5 is a flowchart showing operations of the controller.

If one condition of the closing conditions of the hydraulic brake control is satisfied, the hydraulic brake control unit 150 starts the closing-stage pressure decrease control according to the flowchart shown in FIG. 5 (START).

In the closing-stage pressure decrease control, the hydraulic brake control unit 150, first, sets a first pressure decrease rate R1 according to the vehicle body velocity Vc (S1). After step S1, the hydraulic brake control unit 150 makes a determination as to whether or not the closing-stage condition is the receipt of a cancellation request (S2).

If it is determined in step S2 that the closing-stage condition is the receipt of a cancellation request (Yes), then the hydraulic brake control unit 150 sets the pressure decrease rate R at the first pressure decrease rate R1 set in step S1 (S3). If it is determined in step S2 that the closing-stage condition is not the receipt of a cancellation request (No), then the hydraulic brake control unit 150 makes a determination as to whether or not the closing-stage condition is the stop of the vehicle 2 (S4).

If it is determined in step S4 that the closing-stage condition is the stop of the vehicle 2 (Yes), then the hydraulic brake control unit 150 sets the pressure decrease rate R at the second pressure decrease rate R2 (S5). If it is determined in step S4 that the closing-stage condition is not the stop of the vehicle 2 (No), which means that the closing-stage condition is the remaining one condition (i.e., occurrence of abnormal condition in the hydraulic pressure unit 10), then the hydraulic brake control unit 150 sets the pressure decrease rate R at the third pressure decrease rate R3 (S6).

After the pressure decrease rate R is set in step S3, S5 or S6, the hydraulic brake control unit 150 exercises a closing-stage pressure decrease control based on the set pressure decrease rate R (S7). To be more specific, in step S7, the hydraulic brake control unit 150 regulates an electric current to be passed though the outlet valve 14 in such a way that the set pressure decrease rate R is achieved.

Next, a detailed description will be given of a closing-stage pressure decrease control depending on each of the closing-stage conditions, with reference to FIGS. 6 to 8.

Figure 6:
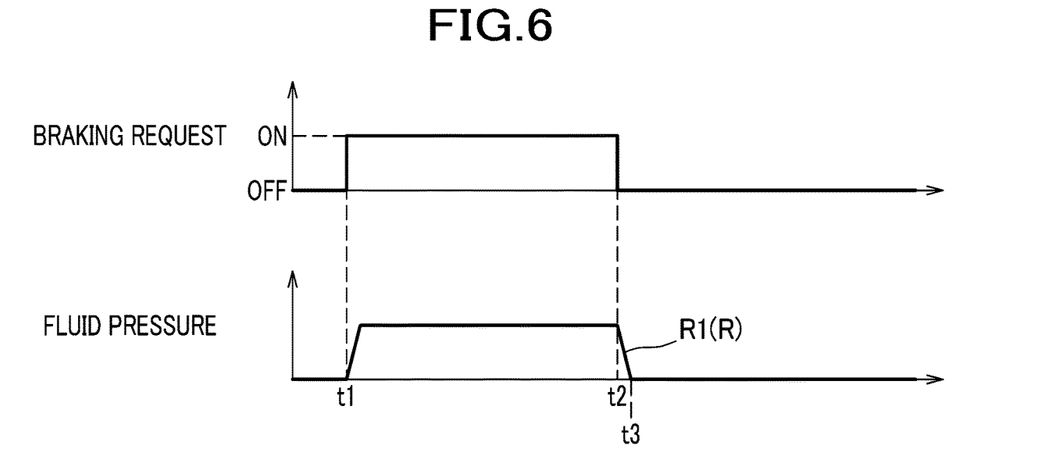
FIG. 6 is a timing chart showing a pressure decrease control exercised in a closing stage of a process of a hydraulic brake control as executed when a request for braking has ceased.

As shown in FIG. 6, when a driver turns on the parking switch 92 while the vehicle is running (time t1), the hydraulic brake control unit 150 starts the hydraulic brake control. When the driver takes his/her hand off the parking lever or depresses the accelerator pedal 7 and causes a request for cancellation to be outputted to the hydraulic brake control unit 150, the hydraulic brake control unit 150 sets the pressure decrease rate R at the higher first pressure decrease rate R1 as represented with a sharply declining slope, to cause the brake fluid pressure to decrease rapidly at the set first pressure decrease rate R1. Accordingly, the braking power applied to the wheels 3 can be removed in a very short time (t2 to t3), so that a driver can be relieved from feeling frustrated as if "dragging".

Figure 7:
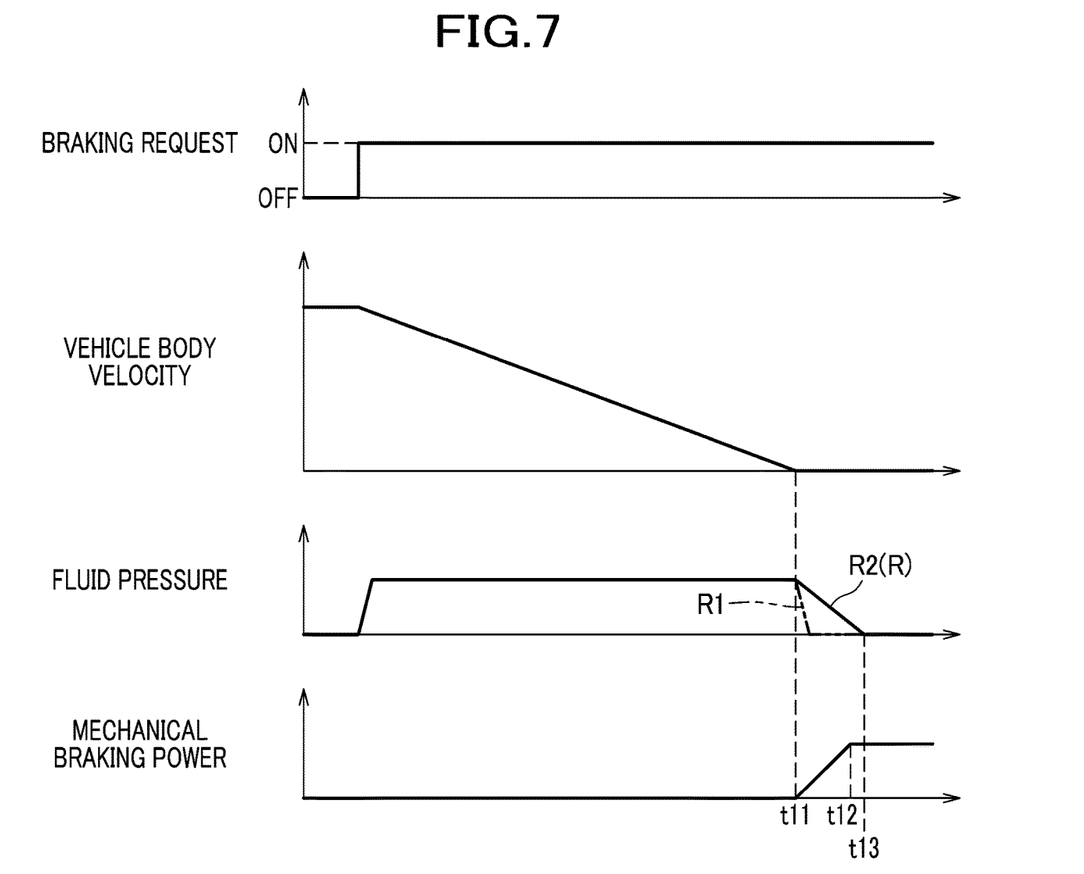
FIG. 7 is a timing chart showing a pressure decrease control exercised in a closing stage of a process of a hydraulic brake control as executed when a vehicle has been stopped.

As shown in FIG. 7, when the hydraulic brake control unit 150 determines, during the hydraulic brake control, that the vehicle body velocity Vc has become a value approaching 0 (e.g., 0), that is, the vehicle 2 has been stopped (time t11), the hydraulic brake control unit 150 starts a closing-stage pressure decrease control. On the other hand, when the closing-stage pressure decrease control is started (time t11), the mechanical brake control unit 160 starts a mechanical brake control by actuating the electric motor 210 of the parking brake device 200.

In the closing-stage pressure decrease control, the hydraulic brake control unit 150 sets the pressure decrease rate R at the second pressure decrease rate R2 lower than (as represented with a slope declining more gently than that of) the first pressure decrease rate R1, to cause the brake fluid pressure to decrease slowly at the set second pressure decrease rate R2. Accordingly, the brake fluid pressure can be applied to the wheels 3 for a relatively long time (t11 to t13) in comparison, for example, with an alternative configuration in which the brake fluid pressure is caused to decrease rapidly at the first pressure decrease rate R1 as indicated by the chain double-dashed line in the chart, so that the braking power can be maintained when the brake control is switched from the hydraulic brake control to the mechanical brake control, and the vehicle 2 can be kept at a halt properly.

It is to be understood that the second pressure decrease rate R2 may preferably but not necessarily be set to have a slope such that the brake fluid pressure becomes 0 after a time (time t12) when the mechanical braking power (the force of the nut 250 pushing the brake piston 240), which increases under the mechanical brake control starting at approximately the same time as the time when the closing-stage pressure decrease control starts, reaches a target value (e.g., the maximum value) as shown in the chart. In other words, the second pressure decrease rate R2 may preferably but not necessarily be set to have a slope such that the total braking power as the sum of the braking power derived from the brake fluid pressure and the mechanical braking power becomes equal to or higher than a predetermined value while the closing-stage pressure decrease control is exercised effectively.

Figure 8:
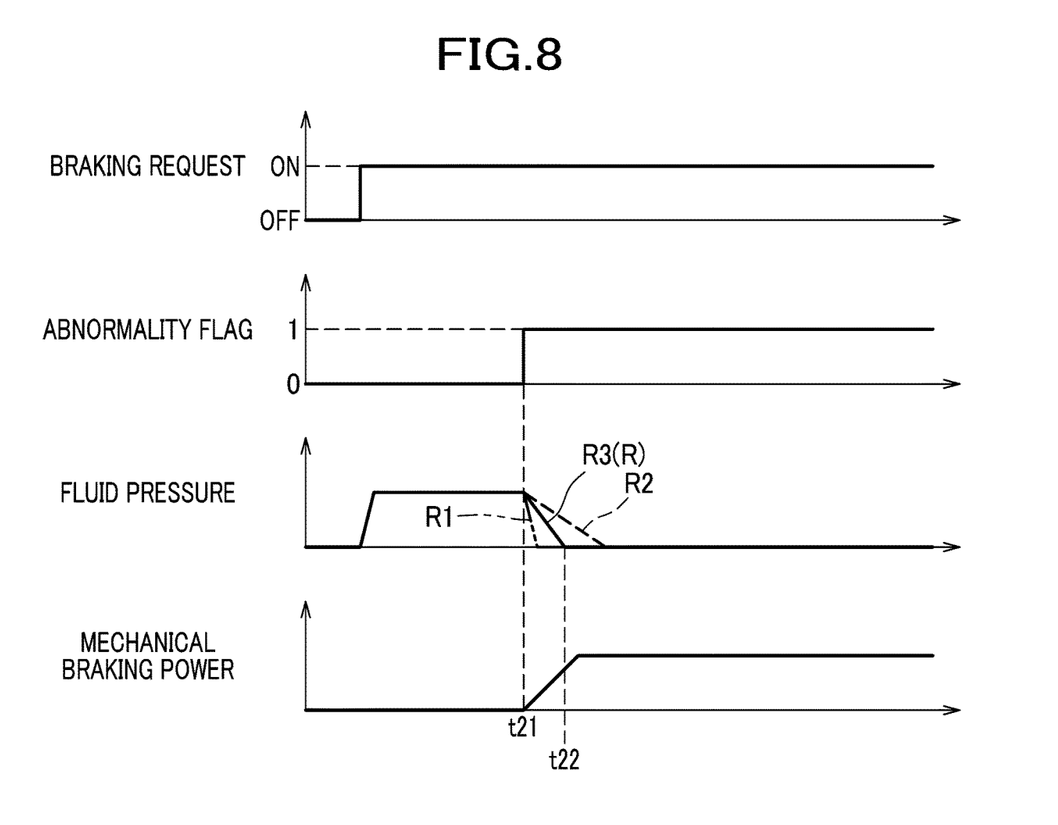
FIG. 8 is a timing chart showing a pressure decrease control exercised in a closing stage of a process of a hydraulic brake control as executed when an abnormal condition has been observed in the hydraulic pressure unit.

As shown in FIG. 8, if the hydraulic brake control unit 150 determines that an abnormal condition has occurred in the hydraulic pressure unit 10 during the hydraulic brake control (time t21), then the hydraulic brake control unit 150 starts the closing-stage pressure decrease control. On the other hand, at the time when the closing-stage pressure decrease control is started (time t21), the mechanical brake control unit 160 starts the mechanical brake control.

In the closing-stage pressure decrease control, the hydraulic brake control unit 150 sets the pressure decrease rate R at the third pressure decrease rate R3 lower than (as represented with a slope declining more gently than that of) the first pressure decrease rate R1 and higher than (as represented with a slope declining more sharply than that of) the second pressure decrease rate R2, to cause the brake fluid pressure to decrease at the set third pressure decrease rate R3. Accordingly, the brake control can be switched from the hydraulic brake control to the mechanical brake control properly when the abnormal condition has been detected in the hydraulic pressure unit 10.

Herein, when the brake control is switched from the hydraulic brake control to the mechanical brake control based on the abnormal condition in the hydraulic pressure unit 10, the rapid decrease of the brake fluid pressure at such a rate as the first pressure decrease rate R1 with the sharply declining slope would potentially make the brake fluid pressure into 0 before the mechanical braking power is raised to a sufficiently high level, with the result that the brake control could not be exercised properly. When the brake control is switched from the hydraulic brake control to the mechanical brake control based on the abnormal condition in the hydraulic pressure unit 10, the slow decrease of the brake fluid pressure at such a rate as the second pressure decrease rate R2 with the gently declining slope would potentially make the total braking power as the sum of the brake-fluid-pressure-derived braking power and the mechanical braking power excessively high, with the result that the wheels 3 would disadvantageously become likely to lock up. To address these problems, the third pressure decrease rate R3 is set, as in the present embodiment, at a rate (with a slope) between (the slope of) the first pressure decrease rate R1 and (the slope of) the second pressure decrease rate R2, so that the brake control can be switched properly from the hydraulic brake control to the mechanical brake control.

According to the present embodiment as described above, the following advantageous effects, in addition to the aforementioned effects, can be achieved.

Since the pressure decrease rate R is set according to the closing-stage condition that is a closing condition satisfied upon entry into the closing stage of the process of the hydraulic brake control, a passenger's discomfort can be restrained even when the brake is applied by the use of the parking switch 92.

Since the higher the vehicle body velocity Vc, the higher the first pressure decrease rate R1 is set, the higher the vehicle body velocity Vc, the less likely the driver can be to feel as if "dragging", and thus the driver's discomfort can be restrained more effectively.

The above-described embodiment may be modified and implemented in various forms as will be illustrated below. In the following description, substantially the same members and process steps as those in the above-described embodiment will be designated by the same reference characters, and a description thereof will be omitted.

In the above-described embodiment, three conditions are adopted as the closing condition of the hydraulic brake control; however, any number of the closing condition may be adopted, instead. For example, the closing condition may be two conditions consisting of receipt of a request for cancellation of the hydraulic brake control and a stop of the vehicle; in this setting, the pressure decrease rate R may be set at the first pressure decrease rate R1 or the second pressure decrease rate R2. Another alternative example of such two closing conditions may consist of the receipt of a request for cancellation of the hydraulic brake control and an abnormal condition in the hydraulic pressure unit 10; in this setting, the pressure decrease rate R may be set at the first pressure decrease rate R1 or the third pressure decrease rate R3. Yet another alternative of the two closing conditions may be the stop of the vehicle 2 and an abnormal condition in the hydraulic pressure unit 10; in this setting, the pressure decrease rate R may be set at the second pressure decrease rate R2 or the third pressure decrease rate R3.

In the above-described embodiment, the wheel deceleration Dw is set at a value taking a positive value when the vehicle 2 is decelerating; however, the the wheel deceleration may be set at a value taking a positive value when the vehicle is accelerating. That is, the wheel deceleration Dw may be computed by subtracting the last value from the present value of the wheel velocities Vw. In this configuration, the stopping control may be exercised if the wheel deceleration, which takes a negative value when decelerating, passes a negative threshold to a decreasing side (with increasing difference from zero).

In the above-described embodiment, the controller 100 of the vehicle brake fluid control device 1 is taken as an example of the parking brake control device; however, the parking brake control device may be configured, for example, as an ECU (Electronic Control Unit) for controlling an engine, or the like.

In the above-described embodiment, the parking brake device 200 is illustrated as comprising the electric motor 210, the speed reducer 220, the nut 250, and the brake piston 240; however, any type of the parking brake device may be feasible as long as it transmits power of an electric motor to the friction member(s) mechanically. For example, the parking brake device may be configured to transmit power of an electric motor to the friction member(s) by a wire.

In the above-described embodiment, the so-called disc brake which comprises the brake rotor BR is illustrated as an example of the wheel brakes FR, FL, RR, RL; however, each of the wheel brakes may be configured, for example, as a drum brake. In this configuration, a rotating member is configured to be a drum rotating together with a wheel, and a friction member may be a brake shoe that is slidably contactable with the inner peripheral surface of the drum.

The actuation switch may not be limited to the parking switch 92 which detects motion of the parking lever as in the above-described embodiment; for example, a switch which turns ON by a driver's pressing operation and turns OFF by his/her subsequent pressing operation may also be feasible.

The elements explained in the above-described embodiments and modified examples may be implemented in combination where appropriate.

The invention claimed is:

1. A parking brake control device that controls a hydraulic pressure unit for braking wheels hydraulically and a parking brake device for braking the wheels by transmitting power of an electric motor to the wheels mechanically, the parking brake control device comprising:
   a hydraulic brake control unit configured to exercise a hydraulic brake control under which a brake is applied to the wheels by the hydraulic pressure unit, on condition that a signal is received from an actuation switch for actuating the parking brake device, while a vehicle is running; and
   a pressure decrease rate setting unit configured to set a rate of decrease of pressure in such a manner that when a pressure decrease control is exercised in a closing stage of the hydraulic brake control, the rate of decrease of pressure is set according to a closing condition satisfied upon entry into the closing stage of the hydraulic brake control,
   wherein if the closing condition is receipt of a request for cancellation of the hydraulic brake control as submitted by a driver's operation while the vehicle is running, the pressure decrease rate setting unit sets the rate of decrease of pressure at a first pressure decrease rate having a value greater than a minimum value thereof.

2. The parking brake control device according to claim 1, further comprising:
   a switching unit configured to switch a brake control from the hydraulic brake control to a mechanical brake control under which a brake is applied to the wheels by the electric motor of the parking brake device,
   wherein the switching unit is configured to switch the brake control from the hydraulic brake control to the mechanical brake control when the vehicle has been stopped, and
   wherein if the closing condition is a stop of the vehicle, the pressure decrease rate setting unit sets the rate of decrease of pressure at a second pressure decrease rate lower than the first pressure decrease rate.

3. The parking brake control device according to claim 2, wherein the switching unit is further configured to;
   switch the brake control from the hydraulic brake control to the mechanical brake control when an abnormal condition has been detected in the hydraulic pressure unit, and
   wherein if the closing condition is an abnormal condition in the hydraulic pressure unit, the pressure decrease rate setting unit sets the rate of decrease of pressure at a third pressure decrease rate lower than the first pressure decrease rate and higher than the second pressure decrease rate.

4. The parking brake control device according to claim 1, wherein the pressure decrease rate setting unit is configured to:
   set the first pressure decrease rate at a first rate if a vehicle body velocity is a first velocity, and
   set the first pressure decrease rate at a second rate higher than the first rate if the vehicle body velocity is a second velocity higher than the first velocity.

5. The parking brake control device according to claim 1, further comprising:
   a switching unit configured to switch the brake control from the hydraulic brake control to a mechanical brake control under which a brake is applied to the wheels by the electric motor of the parking brake device, when an abnormal condition has been detected in the hydraulic pressure unit, and
   wherein if the closing condition is an abnormal condition in the hydraulic pressure unit, the pressure decrease rate setting unit sets the rate of decrease of pressure at a third pressure decrease rate lower than the first pressure decrease rate.

6. The parking brake control device according to claim 1, further comprising:
   a switching unit configured to switch the brake control from the hydraulic brake control to a mechanical brake control under which a brake is applied to the wheels by the electric motor of the parking brake device, when the vehicle has been stopped or when an abnormal condition has been detected in the hydraulic pressure unit, and
   wherein the pressure decrease rate setting unit is configured to:

set the pressure decrease rate at a second pressure decrease rate if the closing condition is a stop of the vehicle, and set the pressure decrease rate at a third pressure decrease rate higher than the second pressure decrease rate if the closing condition is an abnormal condition in the hydraulic pressure unit.

\* \* \* \* \*